(12) United States Patent
Adams

(10) Patent No.: US 8,767,547 B2
(45) Date of Patent: Jul. 1, 2014

(54) FLOW STATE AWARE QOS MANAGEMENT WITHOUT USER SIGNALING

(75) Inventor: John Leonard Adams, Felixstowe (GB)

(73) Assignee: New Renaissance Technology and Intellectual Property, Burlingame, CA (US)

(*) Notice: Subject to any disclaimer, the term of this patent is extended or adjusted under 35 U.S.C. 154(b) by 1209 days.

(21) Appl. No.: 12/628,927

(22) Filed: Dec. 1, 2009

(65) Prior Publication Data

US 2010/0135158 A1    Jun. 3, 2010

Related U.S. Application Data

(60) Provisional application No. 61/118,964, filed on Dec. 1, 2008.

(51) Int. Cl.
*G01R 31/08* (2006.01)

(52) U.S. Cl.
USPC ........... 370/235; 370/230; 370/252; 370/391; 370/392; 370/395.1; 370/401; 370/474; 370/473

(58) Field of Classification Search
None
See application file for complete search history.

(56) References Cited

U.S. PATENT DOCUMENTS

| 7,382,727 B2 * | 6/2008 | Yang | 370/232 |
| 2007/0115825 A1 * | 5/2007 | Roberts | 370/235 |
| 2008/0267184 A1 * | 10/2008 | Arisoylu et al. | 370/391 |

* cited by examiner

*Primary Examiner* — Kibrom T Hailu
(74) *Attorney, Agent, or Firm* — Transpacific Law Group; Pavel I. Pogodin, Esq.

(57) ABSTRACT

Conventional packet network nodes react to congestion in the packet network by dropping packets in a manner which is perceived by users to be indiscriminate. In embodiments of the present invention, indiscriminate packet discards are prevented by causing packets to be discarded according to bandwidth allocations that intelligently track flow sending rates. Flows are allocated bandwidth based on policy information. Where such policy information indicates that the flow should be treated as delay-sensitive, the present invention includes means to allocate an initial minimum rate that will be guaranteed and such flows will also have the use of an additional capacity that varies depending on the number of such flows that currently share an available pool of capacity. This provides a congestion alleviation method which is less annoying to users since communications that have been in existence for longer are less susceptible to component packets being deleted.

15 Claims, 11 Drawing Sheets

FSA signalling procedure for each service context

Figure 1: FSA signalling procedure for each service context

Figure 2: Out-of-band signalling combined with flow-based QoS 200

Figure 3: Network configuration

Figure 4: High-level functions of the flow-based QoS management node

Figure 5: Buffer alarm states of buffer 6.1

Figure 6: Expansion of function 6.2

Figure 7: Expansion of function 6.3

Figure 8: Second preferred embodiment – FSA shaper

Figure 9: Expansion of function 6 in the second preferred embodiment

Figure 10: Expansion of the shaper function 6.5 in the second preferred embodiment

FLOW STATE AWARE QOS MANAGEMENT WITHOUT USER SIGNALING

CROSS REFERENCE TO RELATED APPLICATIONS

This application claims the benefit of priority to U.S. Provisional Application No. 61/118,964, filed on Dec. 1, 2008, titled "FLOW STATE AWARE QoS MANAGEMENT WITHOUT USER SIGNALLING" which is herein incorporated by reference in its entirety.

DESCRIPTION OF THE INVENTION

1. Field of the Invention

The present invention relates to a communications network and a method of operating a communications network.

2. Description of Background Art

Recently, the demand for streaming video to a computer via the Internet has grown strongly. This has led to a need to supply increasing amounts of video material over local communication networks (whether the copper pairs used by telephone network operators or the coaxial cables used by cable television network operators).

In telephony networks this additional demand is being met by the introduction of Digital Subscriber Loop (DSL) technology. As its name suggests, this technology carries digital signals over the local copper loop between a user's home and a local telephone exchange. Data-rates of several megabits per second to the user's home are achievable. The digital signal is conveyed between modems placed at either end of the copper loop—the modem in the user's home usually being incorporated in a set-top box. The advantages of statistical multiplexing have led to the digital signals being organised into packets (whether they be Asynchronous Transfer Mode (ATM) packets or Internet Protocol (IP) packets).

Many cable networks are being upgraded to carry digital signals to user's homes. At least where the signals have been carried over the Internet, those digital signals are again arranged into packets.

Video material requires a data rate which varies between 1.5 Mbps (for a quality comparable to that offered by a video cassette recording) to 20 Mbps (High-Definition Television). In DSL networks, this means that a mechanism is needed to manage contention for the capacity offered over the copper loop leading to the user's home. Although cable networks can carry around sixty video streams simultaneously, their capacity is normally shared by several hundred users, meaning that contention for the capacity on the cable will also need to be managed as cable network users demand more choice in the material they view.

In a conventional telephone network, the problem of contention for scarce telecommunication resources is dealt with by simply preventing a user from receiving (or sending) any traffic unless the necessary capacity to carry that traffic can be reserved beforehand. There are numerous connection admission control schemes of this sort for packet networks too—examples include the Resource Reservation Protocol (RSVP). Although such schemes prevent congestion, QoS management must also manage so-called "elastic" traffic where there is potentially a need for a minimum guaranteed rate but frequently a desire to transmit the flow as fast as possible, subject to network congestion constraints and constraints on maximum sending rates.

An alternative to the use of connection admission control in packet networks is to use reactive flow control. These schemes allow users access to communications resources but attempt to cause senders to decrease their sending rate on the onset of congestion. The scheme used for reliable transmission across the Internet (Transmission Control Protocol) is the most common example. This is unsuitable for video flows however, since real-time video servers cannot reduce their sending rate.

In most flow control schemes, all users are adversely affected by the onset of congestion. Some flow control schemes are more sophisticated, classifying traffic into different classes, with some classes being more likely to suffer packet delay or discard than others. In situations where such classification is not available or where most traffic is within one class, alternative solutions must be provided. For example, one such alternative solution concentrates the adverse effects of ATM cell discard on one IP packet at a time.

A discussion toward the Internet based Next Generation Network (NGN) is actively progressed around the standards bodies including the ITU-T (International Telecommunication Union—Telecommunication Standardization Sector) and ETSI (European Telecommunications Standards Institute), IEEE (Institute of Electrical and Electronics Engineers), IETF (Internet Engineering Task Force), and etc. The roles of the standard bodies are different. The IEEE and IETF develop the core technology for specific problems in layer 2 and layer 3, respectively. ITU-T and ETSI develop the network architecture and control procedure.

The QoS control or resource control architecture has been developed in the several standard bodies. To name a few, they are ITU-T, ETSI, Cable Lab, 3GPP, MSF, and the DSL forum. Among those organization, CableLab, and DSL forum, 3GPP, and ETSI define the QoS control architecture in a particular case while ITU-T defines the generic architecture that can cover the outcomes of other standard bodies.

CableLab defines the dynamic QoS (DQoS) control architecture for the Hybrid Fiber and Coaxial (HFC) network. The control architecture is designed for the uniqueness of the HFC network. In the HFC network, multiple CMs (Cable Modems) share an upstream channel to CMTS (Cable Modem Termination System). The bandwidth is controlled based on layer 2 MAC protocol called DOCSIS (Data Over Cable System Interface Specification). The layer 2 level QoS guarantee mechanism is defined from the DOCSIS version 1.1. The goal of the DQoS is supporting the QoS guaranteed service through HFC network.

DQoS defines the procedure of the call setup signalling and the dynamic QoS control on DOCSIS interface. In the architecture, the CMS (Call Management Server)/Gate controller controls the call establishment. The guaranteed bandwidth between CM and CMTS is reserved dynamically during the call setup signalling. The CMS/Gate Controller triggers the layer 2 or layer 3 QoS signalling to reserve the bandwidth in the HFC network by sending commands to CM, CMS, or MTA (Multimedia Terminal Adapter).

DQoS has been refined through version 1.0, 1.5, and 2.0. Version 1.0 defines the basic call setup signalling procedure for both embedded MTA and standalone MTA. The embedded MTA can initiate the dynamic layer 2 QoS signalling while a standalone MTA initiates IP level QoS signalling. Version 1.5 and 2.0 defines the QoS control architecture when SIP (Session Initiation Protocol) based call setup signalling is used. DQoS 2.0 is defined especially for interoperability with IP Multimedia Subsystem (IMS) which is the SIP based call setup architecture developed in 3rd Generation Partnership Project (3GPP). PacketCable Multimedia has been developed for simple and reliable control for the multimedia service over cable network. It defines the service delivery framework for the policy based control on multimedia service. The simple procedure for time or volume based resource authorization, resource auditing mechanism, and security of the infrastructure are defined in PacketCable Multimedia.

Such developments as this strongly suggest that new QoS mechanisms should take account of, and build on top of, the underlying deployment of QoS controls.

Again, the DSL forum defines the resource control at the DSL (Digital Subscriber Line) access network. Unlike Cable network, DSL modem is connected to the subscriber through the dedicated line. Layer 2 level dynamic QoS control between DSL modem and Digital Subscriber Line Access Multiplexer (DSLAM) is not required. The DSL forum focuses more on resource control in the home network especially resource control of multiple terminals behind the home gateway.

The resource control architectures defined in the above mentioned two standard bodies—PacketCable and DSL Forum focus on a specific transport technology (i.e., HFC network and DSL network). The scope of DQoS and DSL forum is mainly within network operator's view. Unlike these, RACF (Resource and Admission Control Functions) of ITU-T and RACS (Resource and Admission Control Subsystem) of ETSI define the resource control architecture in more general aspect.

The QoS control architecture in both RACF and RACS are closely related with 3GPP (3rd Generation Partnership Project) effort. The 3GPP is originally founded for developing new service architecture over cellular network, especially for GSM (Global System for Mobile communication) network. During this effort, 3GPP developed the IMS (IP Multimedia Subsystem) for controlling the IP multimedia services in the areas of session control, service control, and management of database of the subscribers. Even though IMS is initially developed for the evolution of GSM cellular network, its framework can be applicable for any types of transport technologies. The IMS architecture has been adopted to the other QoS control architectures such as 3GPP2 MMD (Multimedia Domain), ETSI TISPAN (Telecoms & Internet converged Services & Protocols for Advanced Networks), and ITU-T NGN. Thus, both RACS and RACF are interoperable with IMS.

In general, RACF and RACS are very similar with each other. The two standards bodies are closely interacted in developing their architecture. There is no significant conflict between the two, but there are still differences. One of differences is the range of the control region. The control region of RACS covers the access network and the edge of the core network. The access network is defined as the region where the traffic is aggregated or distributed without dynamic routing. The resource control in the access network is done in layer 2 level. The core network is the region that the IP routing starts. The core network is out of scope in the RACS. RACF, however, covers both core and access network. RACF covers both fixed and mobile networks while RACS is defined for the fixed network. For the control mechanism, the RACF defines more control scenarios than RACS. Therefore, RACS is considered as a subset of RACF.

ITU-T defines the QoS control functions based on its NGN architecture. One of the important concepts in the ITU-T NGN architecture is the independence of the transport and the service. The transport is concerning about the delivery of packets of any kind generically, while the services are concerns about the packet payloads, which may be part of the user, control, or management plane. In this design principle, the NGN architecture is divided into two stratums—Service Stratum and Transport Stratum. Under the concept of the independence of a service and transport functions, the network resource and reliability are guaranteed by the network side upon request from the service stratum. Service Stratum is responsible for the application signalling and Transport Stratum is responsible for reliable data packet forwarding and traffic control. The service stratum can be a simple application server or a full-blown system such as IMS (IP Multimedia Sub-system).

Transport control function is located in Transport stratum interfacing with the Service stratum. It determines the admission of the requested service based on the network policy and the resource availability. It also controls the network element to allocate the resource once it is accepted. Resource and Admission Control Functions (RACF) is responsible for the major part of the admission decision and resource control of the transport function.

Once again, this developing infrastructure needs to be taken account of when considering new QoS mechanisms.
Review of Current Per-flow QoS Controls The flow level transport technology is not a new concept. The core technologies for the traffic management schemes such as in flow level scheduling, policing, and sharing are already available in the commercial product. The current deployment of flow base control, however, is limited only at the edge of the network. Typical examples of flow base control are traffic monitoring, packet inspection, PacketCable access, session border controller, edge router, and interworking between two networks. They are mostly stand alone solution at the edge of the network.

However, flow level traffic control only at the edge cannot guarantee the flow level QoS. Furthermore, DiffServ guarantees the QoS only if the premium traffic load is very low (~ under 10%). On the other hand, having scalable control architecture for flow level traffic control along the data path is a challenging issue, because the number of flows in a network is huge.

There are several schemes proposed for the scalable control of traffic using flow level mechanisms. These are listed below.

(1). Flow Aware Network (FAN) FAN applies three different regimes based on the network status. They are the "transparent regime", "elastic regime", and "overload regime". The transparent regime is applied when the network has no congestion at all. The elastic regime is applied when the network experiences the occasional traffic congestion because of a few high rate data flows. The overload regime is applied when the traffic overloads the link capacity in the network.

No traffic control is required in the transparent regime. The traffic control is effective only in the overload or elastic regime. In the elastic regime, the network enforces the bandwidth limit for every flow. Every flow is assigned the same amount of bandwidth. In the overload regime, new flows are blocked to protect existing flows. To reduce the control complexity, an implicit approach is preferred where no signalling is required for controlling the network. Each node makes locally optimal decision based on local observation.

The main focus of FAN is the simplicity. It requires no signalling. Only implicit admission control is required upon congestion. Although the control mechanism is very simple, it is shown that the network is stabilized remarkably in FAN. However, this architecture is designed mainly for network stabilization aspect. Every flow is treated equally. In order to support various of QoS requirement for individual flow, this architecture should be improved.

(2). Flow Sate Aware (FSA) technologies: FSA is developed to provide different QoS for the individual flow. FSA defines the service types based on typical example of Internet services. They are Maximum Rate (MR), Guaranteed Rate (GR), Variable Rate (VR), and Available Rate (AR). GR is designed for applications requiring guaranteed bandwidth for the entire duration of the flow. MR is designed for streaming media such as video and voice. AR is designed for data traffic flow where the application can setup the flow rate at the maximum rate that the network can currently support. VR is the combination of AR and MR. VR could be used for obtaining a maximum response time for a transaction (e.g., a stock trade with maximum transaction time). The MR portion guarantees the minimum guaranteed bandwidth and AR portion is for use available network resource. FSA divides the network resource into two portions. One is Fixed Rate (FR) and the other is Network Rate (NR). FR is requested when flow needs a fixed rate available during the service. NR is requested when flow sends buffered data using network available bandwidth. Service type GR and MR request FR, AR requests NR, and VR requests both NR and FR.

FR and NR are requested by the signalling and every node along the path configures its resource based on the requested FR and NR. For the call setup signalling, the source node and destination node exchanges the control messages.

FIG. 1 describes the signalling procedure for the service type MR 110, GR 120, and AR 130. In the ingress FSA (iFSA) 101 and egress FSA (eFSA) 102 exchanges the request, response, confirm, renegotiate, and confirm message for request the transport resource. For MR, iFSA sends the data traffic before receiving the response from eFSA. MR is designed based on the concept of the conditional guaranteed bandwidth. For GR, it needs to know the explicit start and ending time of the flow. Therefore, it sends confirm and close messages for acknowledging every transit node reserves and release the requested bandwidth. The service type AR is designed to use network available resource. iFSA and other FSA nodes continuously monitor the network available resource and adjust the NR accordingly.

Both approaches, FAN and FAS, give an insight for flow based traffic control. FAN shows that even very simple flow level traffic control can stabilize the network efficiently. FSA shows that the network resource can be divided into FR and NR. It also indicates that the transit nodes should be controlled for end-to-end flow level QoS.

However, the two approaches have outstanding issues. As mentioned earlier, FAN is not designed for supporting various QoS requirement of the service. Its main objective is stabilizing the overall network performance. In this viewpoint, FAN treats every flow equally. This may stabilize the transport network in general, but the network provider cannot generate additional profit, because FAN cannot support the service that has special QoS treatment. Good business model is hardly found in this case.

FSA is designed for supporting various QoS requirement. Its implementation can be done in both the in-band signalling and out-of-band signalling. The in-band signalling procedure requires the every node exchanges the request and response. The request need to be examined by the all the transit node. The destination node generates the response message, and source node finds the agreed rate from the response message. In this approach every FSA node should maintain the flow state.

Requiring FSA signalling feature in every user terminal is possible. However, by making the terminal independent of FSA, we can have several benefits. First, the terminal usually has different capability. The network architecture should be flexible enough to support multiple types of terminal in a network. The terminal can support transport QoS signalling but also has application signalling. The application signalling is common for all terminal types. In order to support more terminal types, the QoS signalling of terminal should be designed in application level. Second, the network security is important in managed network. Enabling the signalling function in the terminal may cause the security hole in the network. For resolving this problem, prior art systems specify the mechanism to authorize the in-band signalling in the application signalling phase. FSA signalling initiated in the network side from the network edge can be another option to avoid the security problem.

In both FAN and FSA approaches, focus is mainly in the transport control. In order to take account of the existing deployment of QoS functions, the concept of RACF function needs to be considered.

(3). FSA with out-band signalling In this proposal, the FSA signalling is combined with RACF. CPE (Customer Premises Equipment) or user terminal should be able to request the flow level resource in any kind of application signalling. In this aspect, the CPE and user terminal should be protocol independent.

Second, this proposal focuses flow-based control in the access network, not the core. In the access network, user data traffic is statically routed to the edge of the core network, and the downstream data traffic is statically forwarded from the edge of the core network to the end user. Core supports both IP based dynamic routing and layer 2 based static forwarding. The traffic volume, number of flows, and dynamicity of traffic are different in the core and access. Traditional access network controls the bandwidth based on subscribed bandwidth per user in L2 level. For flow level traffic control, however, the bandwidth should be controlled by individual flow. Flow awareness capability is required in the access nodes. The static packet forwarding and scheduling in the flow level granularity is required in the access network. The call by call traffic control and policy enforcement from control plane (e.g., RACF) should be done in micro flow level. In the core, the number of flows is high and call by call flow level control in RACF is difficult to achieve. In the core side network, therefore, the traffic should be controlled in aggregate level rather than micro flow level. The reliability and monitoring capability will be more important in the core. The flow based traffic control and the aggregated traffic control should be translated at the edge of the core network.

These design principles are further illustrated in FIG. 2, which illustrates Out-of-band signalling combined with flow-based QoS 200.

However, none of the above proposals provides a method of managing contention in a packet network which allows flow-based QoS mechanisms to offer:

Preference priority control of some flows in the event of congestion or sudden re-routing of traffic in the event of a network link failure.

Admission of variable rate, delay-sensitive flows requiring some minimum guaranteed bandwidth.

Management of the fastest transfer time (highest available transfer rate).

All of these features need to be realized in an environment where CPE's are not capable of FSA signalling (and therefore they are protocol independent) and where RACF may be deployed and is deciding how much guaranteed bandwidth has been allocated.

SUMMARY OF THE INVENTION

According to the various aspects of the present invention, there is provided a method of operating a packet subnet that aims to solve the problem of managing contention in a packet network allowing:

Preference priority control of some flows in the event of congestion or sudden re-routing of traffic in the event of a network link failure.

Admission of variable rate, delay-sensitive flows requiring some minimum guaranteed bandwidth.

Management of the fastest transfer time (highest available transfer rate).

these features to be realized in an environment where there is no FSA signalling and where RACF may be deployed and is deciding how much guaranteed bandwidth has been allocated.

The said method of operating the subnet comprises:

receiving one or more communication packets indicative of the commencement of a packet communication through said subnetwork, said packet communication comprising a plurality of packets;

responsive to receipt of said one or more communication commencement packets, retrieving policy information relating to any initial or sustained QoS treatment of the flow, wherein said policy information is either derived from packet header information at any level of encapsulation or is derived from policy attributes associated with the physical link on which the packet arrived or will depart, or is associated with any aggregation of flows within which the said commenced flow is one member;

responsive to receipt of said one or more communication commencement packets, and to the retrieved policy information, allowing transfer of the flow subject to per-flow rate and burst limits and per-aggregate flow rate and burst limits of the said aggregates within which the said flow is one member.

Responsive to receipt of said one or more communication commencement packets, storing a set of communication identifiers, each communication identifier enabling identification of packets belonging to one of said commenced packet communications.

Responsive to receipt of said one or more communication commencement packets, and to retrieved policy information, and where the the retrieved policy information indicates guaranteed bandwidth management should be applied to the said flow and where the retrieved policy information also indicates the said flow has an unknown flow rate, then assigning to the flow:

an initial minimum guaranteed rate an initial additional rate assigned from a pool of capacity divided among flows which have this QoS policy allowing immediate transfer of the flow at a rate equal to or less than the minimum plus additional rate allowance.

assigning a preference priority, or protected communication indication, based on the retrieved policy information assigning an initial discard probability to the flow that will determine if it is included in the list of flows that are treated as vulnerable to discard in the event of congestion.

Responsive to receipt of said one or more communication commencement packets, and to retrieved policy information, and where the the retrieved policy information indicates that Best Effort management should be applied to the flow, then assigning each packet of the flow:

to a Best Effort aggregate and allowing transfer of all such packets assigned to this said Best Effort aggregate, subject to aggregate rate and burst limits assigned to this said Best Effort aggregate.

the same preference priority that is assigned to all such packets that are assigned to this said Best Effort aggregate.

The same discard probability that is assigned to all such flows that are assigned to this said Best Effort aggregate.

Responsive to receipt of said one or more communication commencement packets, and to retrieved policy information, and where the retrieved policy information indicates guaranteed bandwidth management should be applied to the flow and where the retrieved policy information also indicates that the said flow has a known flow rate, then assigning to the flow:

a preference priority, or protected communication indication, based on retrieved policy information;

assigning an initial discard probability to the flow that determines if said flow is included in the list of flows that are treated as vulnerable to discard in the event of congestion;

assigning the pre-determined guaranteed rate; and allowing immediate transfer of the flow at a rate equal to or less than the pre-determined rate.

Responsive to receipt of said one or more communication commencement packets, initiating an initial measurement period, during which the actual sending rate of the flow is measured.

Responsive to the termination of the measurement period, retrieving any changes of policy that derive from the measured rate.

Responsive to any changes of policy based upon measured rate, updating the flow state and policer/shaper parameters according to these said changes in policy.

Responsive to receipt of said one or more communication packets, causing each said packet to be delayed prior to transmission towards its destination.

Responsive to the receipt of a said communication packet that causes a threshold of burst tolerance or packet jitter to be reached or exceeded on a flow or group of flows:

Identifying among the said delayed packets belonging to the flow or group of flows and the said newly received packet, which, if any of the packets, has an associated vulnerable to discard state or has the lowest preference priority compared to the others.

Selecting, if two or more such packets be so identified, a single packet randomly chosen among any that are vulnerable to discard or, if none, randomly among any that have the common lowest preference priority.

Responsive to the said packet selection, changing the flow state of the flow to which it belongs so that it is vulnerable to discard and discarding the said packet.

On a threshold level of congestion being reached in said packet subnet:

identifying packets belonging to a communication associated with one of said set of stored identifiers corresponding to one of the said flows vulnerable to discard; and degrading the forwarding of packets so identified, relative to packets belonging to other communications.

Responsive to a predetermined condition being met, removing an identifier from said set of stored identifiers associated with flows vulnerable to discard prior to the cessation of the associated communication.

By operating a packet subnet to introduce, into a stored set of communication identifiers, on or before the commencement of a new communication, a communication identifier which enables the identification of packets belonging to the new packet communication, and discriminating against packets containing a communication identifier belonging to said set when forwarding packets during a period of congestion, a packet subnet operator is able to concentrate the adverse effects of that congestion of selected communications. By additionally removing communication identifiers from said set prior to the cessation of the associated communication, communications that have been in existence for a period of time are treated preferentially to communications that have been in existence for a shorter period of time. This has the advantage that quality of service afforded to a communication increases as the age of the communication increases. This in turn has the advantage of being less annoying to users receiving communications than the random nature of packet discard applied in conventional congestion alleviation mechanisms which might result in a communication a user has been receiving for some time being degraded whilst a newly started communication is allowed to continue.

In some embodiments, said predetermined condition comprises the elapse of a period of time after the commencement of said flow.

In preferred embodiments, said predetermined condition comprises the addition of an identifier to said set of stored identifiers. In this way, the age of a communication relative to other flows determines how packets of the flow are treated on the onset of congestion.

In a preferred embodiment, an increase in minimum rate after measurement is subject to the sum of such minimum rates being less than some threshold value. Some flows may therefore not have their minimum guaranteed rate increased to match the current sending rate. Typically flows of lower preference priority are the least likely to have their minimum rates increased to match their measured rates.

In a preferred embodiment the method of operating the packet subnet is such that, when new flow arrivals when congestion has started or where traffic levels are close to some threshold indicative of the onset of congestion, such flows, are no longer assigned any additional capacity from the available pool and will be placed in the flows vulnerable to discard list.

In a preferred embodiment, the number of flows included in the flows vulnerable to discard list will be divided into groups that are each associated with a specific output link, and a new flow is added to one such group if the current aggregate rate of that group is less than a pre-determined threshold.

In a preferred embodiment, a flow identifier is not removed from the list of flows vulnerable to discard if it would cause the group of common flows of which it is a member that are output on the same output link to have an aggregate rate that is less than a pre-determined threshold.

In this way, it is ensured that sufficient traffic is represented by the communications identified by communication identifiers in said set of flows vulnerable to discard to allow said node to alleviate said congestion.

Preferably, said forwarding step involves discarding said identified packets whilst forwarding said packets belonging to other communications.

Preferably, each packet of a communication contains the communication identifier associated with said communication. This provides a convenient method for determining to which communication a packet belongs.

In preferred embodiments, said method further comprises, on a high level of congestion being reached in said subnet, reading said communication identifier from any one packet or any pre-determined number of packets corresponding to different flows, received at a network node; and adding said communication identifier, or set of identifiers, to said set of flows vulnerable to discard. This provides a mechanism for increasing the number of packets discarded on the advent of a higher level of congestion, and thereby reacting more strongly to higher levels of congestion. Furthermore, by reading a communication identifier from packet(s) received at the subnet at a given time, the probability of selecting a communication which is contributing to the higher level of congestion is increased.

Preferably, said set of communication identifiers comprises a plurality of subsets of communication identifiers, all associated with the same output link on which packets associated with such identifiers will be forwarded a communication identifier first being placed in a first subset that is vulnerable to discard and moving to a second subset that is less vulnerable to discard on the occurrence of a subset removal condition being met, wherein, on the onset of congestion, packets in said second subset are forwarded in preference to packets in said first subset.

This has the advantage of providing another gradation in the increase of quality of service offered to a communication with the age of the communication.

A communication may comprise one or more packet flows.

According to a second aspect of the present invention there is provided a packet network node comprising:

an input for receiving one or more packets;

means arranged in operation to detect congestion in said packet network node, relating to any flow or group of flows and associated limits of network capacity assigned to such a flow or group of flows;

means arranged in operation to detect excessive packet bursts or jitter in said packet network node relating to any flow or group of flows and associated limits of burstiness or jitter assigned to such a flow or group of flows;

a communication identifier store for storing a set of communication identifiers;

means arranged in operation to detect communication announcement packets received at said input, and responsive to said detection to store, in said communication identifier store, a communication identifier included in said communication announcement packet;

means arranged in operation to detect new flows that have commenced without a communication announcement packet received at said input, and responsive to said detection to store, in said communication identifier store, a communication identifier.

means arranged in operation to remove, on a predetermined condition being met, the "vulnerable to discard" status associated with a communication identifier from said communication identifier store prior to the cessation of the communication;

means arranged in operation to delay said arriving packets.

means arranged in operation to identify either a delayed packet or latest received packet that should be discarded when burstiness or jitter detection means determine that such a deletion is required on any flow or group of flows.

means arranged in operation that will automatically select for discard a packet of a flow that is vulnerable to discard or, if none, then any packet that has the lowest preference priority within the delayed or latest arriving set of packets associated with the said flow or group of flows.

means arranged in operation, on the detection of congestion caused by any flow or group of flows as determined by said congestion detection means, to identify packets received at said input belonging to a communication associated with one of said communication identifiers stored in said communication identifier store; and forward packets so that those not in "vulnerable to discard"

status within said group of flows associated with the said congestion are forwarded in preference to packets belonging to flows of the same group that are in "vulnerable to discard" status.

Means arranged in operation to classify a new flow that has commenced without a communication announcement packet, including:

Means to determine any policy associated with the new flow, based upon header information carried in the packet at any layer of encapsulation, or information associated the physical link on which the packet arrived.

Means to assign both an initial minimum guaranteed rate and an additional rate whose value is not guaranteed to be sustained but allows the use of additional spare capacity.

Means to frequently review the amount of additional spare capacity that can be assigned to any said flow that has commenced without a communication announcement packet, and means to assign and police any revised additional spare capacity plus minimum guaranteed capacity against the rate of forwarding of bytes along said flow.

Means to measure the forwarding rates of any flow including means to commence such a measurement for a fixed interval when and if required, as determined through said policy information.

Means to update for any flow or group of flows the assigned rate limits or preference priorities or vulnerability to discard based on the result of one or more measurements of the forwarding rate of any said flow or group of flows, including means to revise the policed rate(s) of the flow or group of flows based on both current minimum guaranteed rate(s) and current additional available rate(s), where either of these components of assigned capacity may be zero.

According to a third aspect of the present invention, there is provided a packet communication source comprising means arranged in operation to generate one or more communication announcement packets according to:

Means that determine any policy information that can be derived for a new flow that has commenced without a communication announcement packet.

Means that include flow identifier information in the header of said generated communication announcement packet which is the same flow identifier that is found in the arriving packet of a new flow that had started without a communication announcement packet means arranged in operation to send said generated communication announcement packets from said output; means along any output link either being the same output link that will be chosen for the other packets of the corresponding flow, or any other link depending on policy information.

BRIEF DESCRIPTION OF THE DRAWINGS

In order to more fully describe embodiments of the present invention, reference is made to the accompanying drawings. These drawings are not to be considered limitations in the scope of the invention, but are merely illustrative.

DETAILED DESCRIPTION OF THE INVENTION

Figure 1:
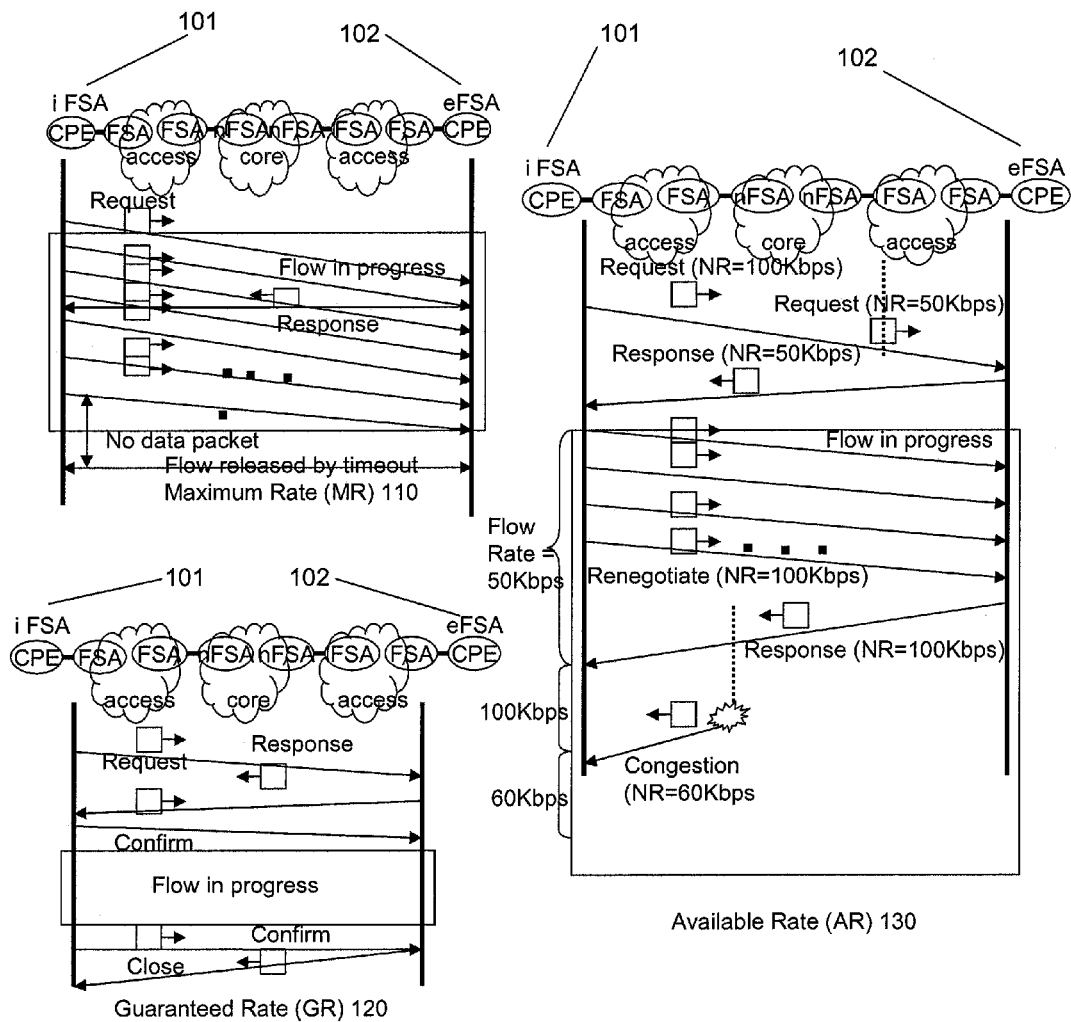
FIG. 1 illustrates the prior art relating to in-band only FSA signalling.
Figure 2:
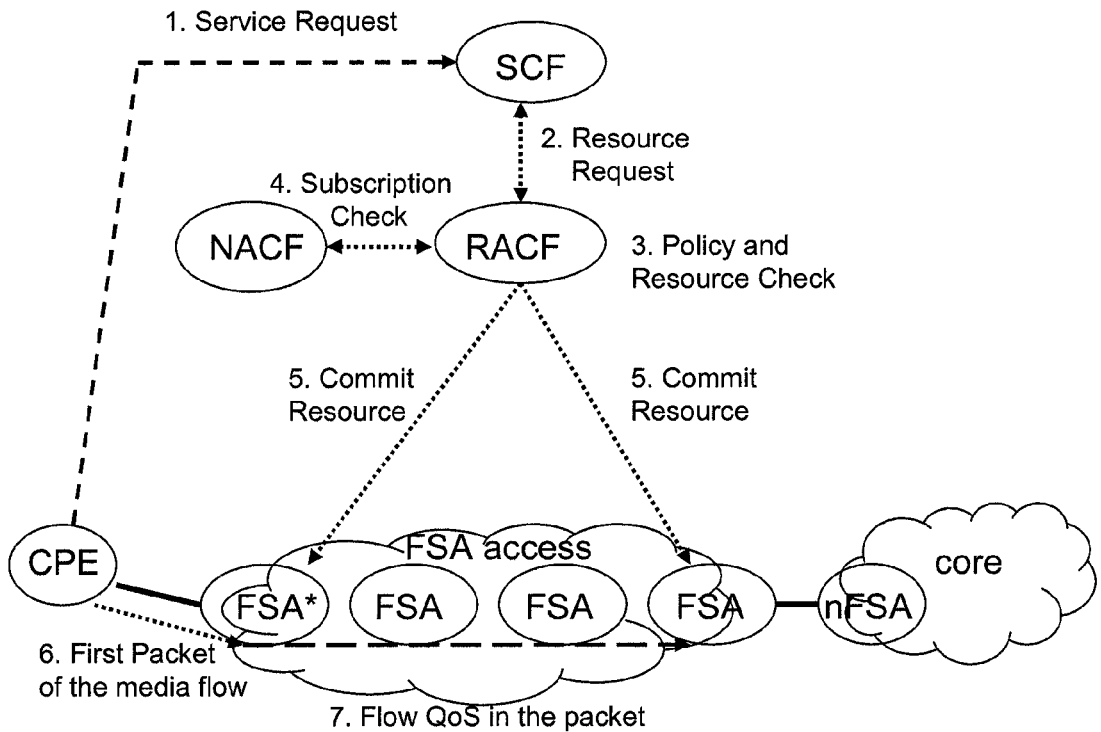
FIG. 2 illustrates alternative prior art relating to a combination of in-band FSA signalling and out-of-band signalling.
Figure 3:
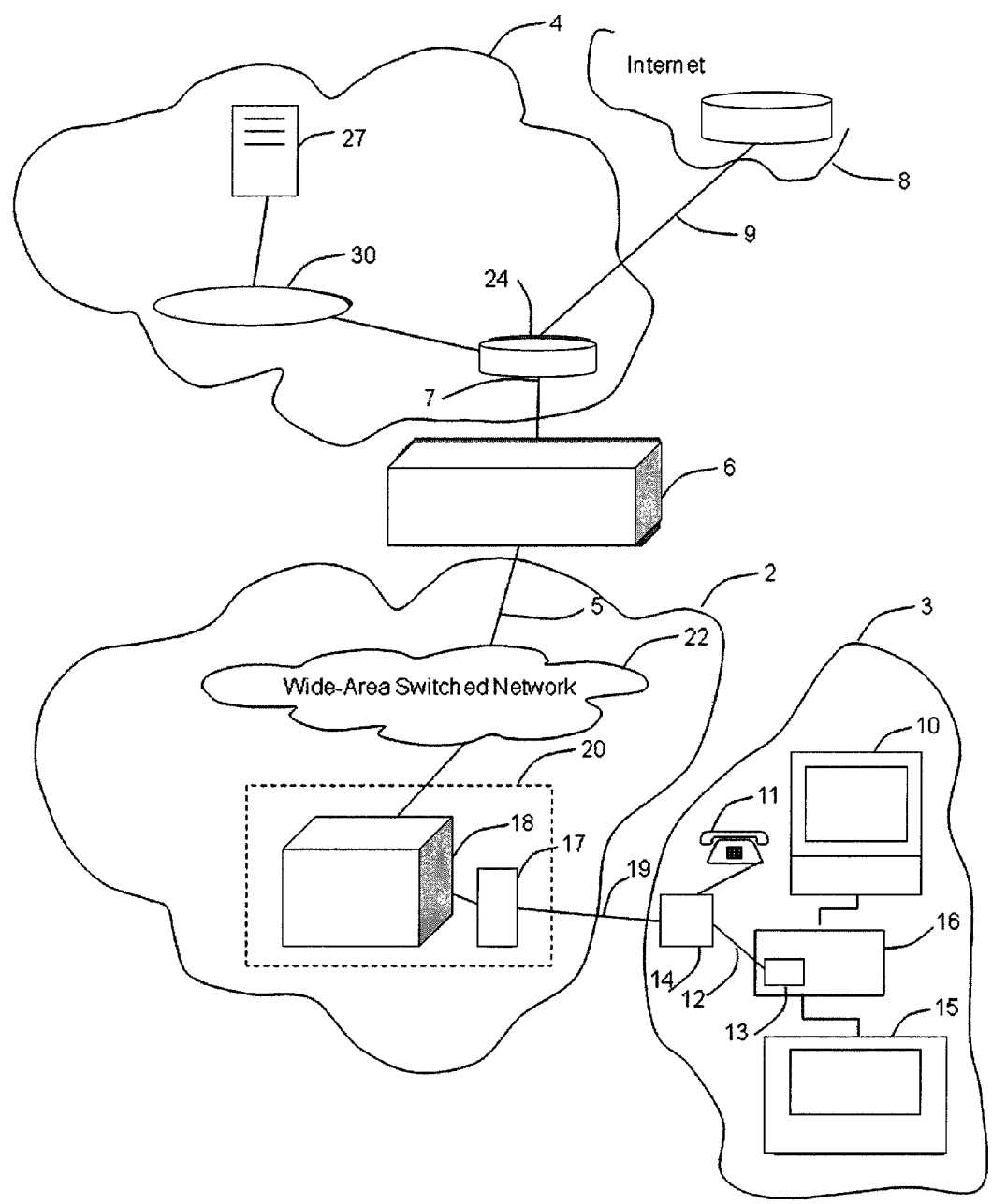
FIG. 3 illustrates the high-level network configuration for the realization of flow-based services

An internetwork (FIG. 3) comprises a user's home network 3, whereas component 2 of FIG. 3 is either an IP routed network or an ATM network or an Ethernet network or layer 1 cross-connection, such as SDH. In FIG. 3 is also a pair of copper wires 19 connecting the user's home network 3 to network 2, an Internet Service Provider's (ISP's) local area network 4, a flow-based QoS manager 6, a network link 5 that represents capacity that the ISP uses to deliver multiple flows to (or receive from) multiple end user networks 3. The ISP network link 7 would represent the input packets into the flow-based QoS manager 6 for flows travelling downstream from the ISP's network 4. The ISP's local area network 4 is connected to the Internet 8 via an Internet link 9.

The network 2 comprises exchange-housed equipment (17,18) housed in the local telephone exchange building 20 and a wide-area network 22 which connects a plurality of such DSLAMs 18 (there is normally one or more DSLAMs per exchange building, only one exchange building is shown in the drawing) towards the flow-based QoS manager 6. As will be understood by those skilled in the art, the exchange-housed equipment includes a Digital Subscriber Line Access Multiplexer (DSLAM) 18 shared between many users and, for each pair of copper wires 19, a splitter unit 17 which terminates the pairs of copper wires 19. The splitter unit 17 is effective to send signals within the frequency range used for normal telephony to the Public Switched Telephone Network (not shown) and to send signals in higher frequency bands to the DSLAM 18.

The user's home network may comprise a PC 10, a digital television 15, a splitter unit 14, a router/set-top box 16 which incorporates an Asymmetric Digital Subscriber Line (ADSL) modem 13, a cable 12 interconnecting the modem 13 and the splitter unit 14, and cables connecting the router 16 to the PC 10 and the digital television 15. The splitter unit 14 is effective to send signals within the frequency range used for normal telephony to the user's telephone 11 and to send signals in higher frequency bands to the ADSL modem 13. The ADSL modem 13 represents the network termination point of network 2.

The ISP's network 4 comprises an IP router 24, a content provider's video server 27, and a Local Area Network 30 which interconnects them. The previously mentioned Internet link 9 is connected to the IP router 24.

Broadband services typically utilize Ethernet as the layer 2 protocol. Again, typically in such a case, the DSLAM terminates the ATM if PPoA is used over the copper pair, and the DSLAM encapsulates the PPP payload in Ethernet for forwarding to the function 6. Link 5 is the aggregate capacity between function 6 and the DSLAMs and it is further subdivided into separate VLANs with either dedicated capacity per DSLAM or capacity that can be borrowed but is preemptively available when traffic conditions require the full capacity that can be available towards or from any one DSLAM.

Two other connection products 5 are based on the IP layer and routing across an MPLS platform.

In these cases, the PPPoE connections will terminate on a BRAS function within network 22. The two options are:
   Using L2TP between the BRAS (acting as the LAC) and the ISP LNS router or direct to the service provider for them to provide the HG functions L2TP LNS (L2TP pass through) etc.
   Create per service provider IP VPN's FIG. 4 relates to the first preferred embodiment and shows an expansion of the function 6, containing sub-function 6.1 to 6.4. The size of buffer 6.1 is based on the following considerations. Firstly, as all flows are being policed at input 6.2 against their individual capacity allocations, it is possible to arrange the operation to be such that the sum of all capacity allocations is never larger than the output link capacity. In such a case, only the simultaneous and independent forwarding of packets from two or more input links to the same output link would cause the need for buffering at the output. But two other conditions are considered within the scope of this present first embodiment of the invention:
   Sudden surges of traffic on to a specific output link, for example due to traffic being re-routed following a link failure. This may happen, for example, in some applications where alternative paths are established between the content source and a group of receiving end-systems and where both paths are carrying some traffic, possibly for cost-reduction reasons.
   Over-booking of the output link capacity This is the deliberate assignment of guaranteed capacity, or minimum guaranteed capacity that anticipates that not all sources will use their current guaranteed capacity assignment. In that case, extra flows can be added on the basis that some are the most vulnerable to discard, should the actual use of assigned capacity be higher than was anticipated.

Figure 4:
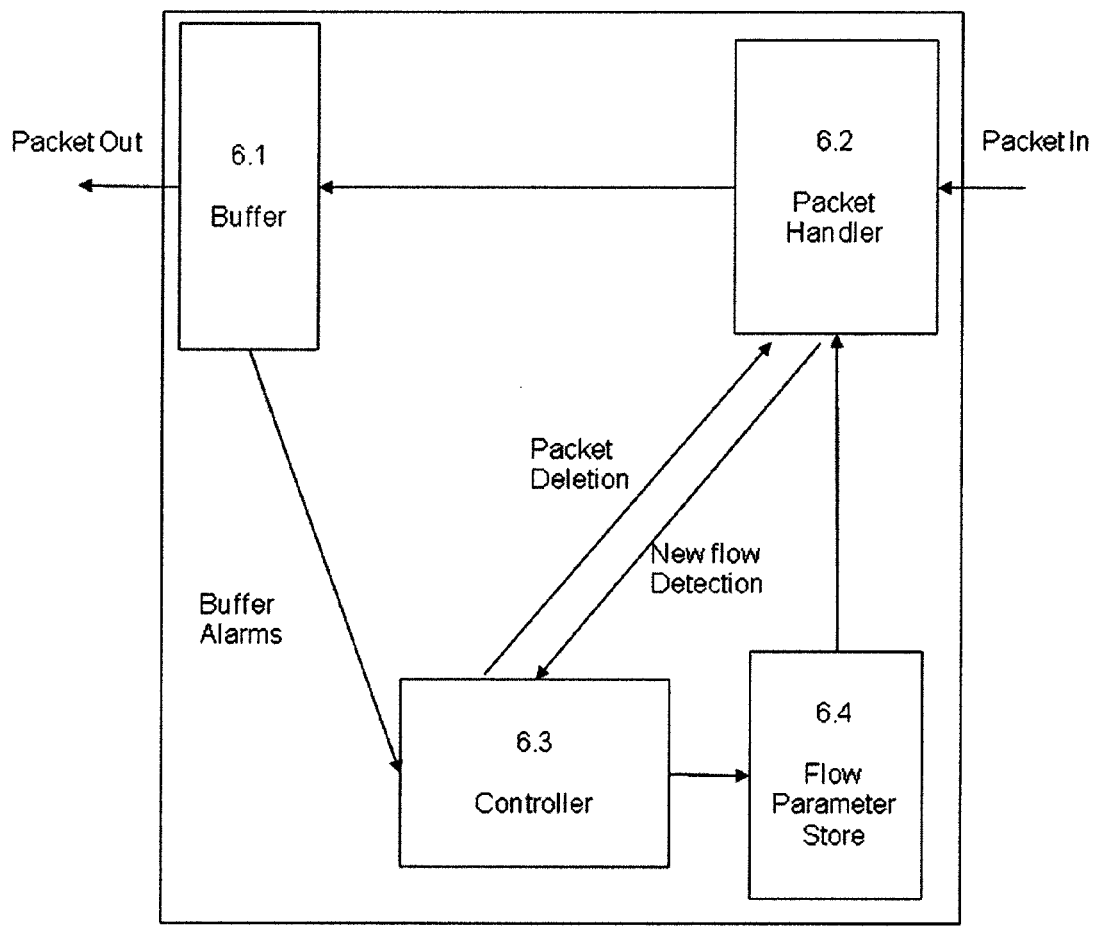
FIG. 4 illustrates the high-level functions of the flow-based QoS management function, according to one embodiment of the present invention.

The elements of FIG. 4 comprise a buffer 6.1, a packet handler 6.2, a controller 6.3 and a flow parameter store 6.4. As will be understood by those skilled in the art buffer 6.1 operates as a store for packets which are to be sent along connection 5. The buffer comprises an area within an electronic memory (that memory might be partitioned between buffers for all customers connected to a given DSLAM (18)). Similarly, the processing carried out in relation to each customer may comprise a virtual process running on a processor shared between those customers. The buffer 6.1 is operable to monitor the degree to which it filled and to send threshold crossing signals to the controller 6.3 on predetermined buffer-fill thresholds being reached. The controller 6.3 monitors these messages and maintains a state machine which indicates the current state of the buffer. Packet handler 6.2 is operable to detect the arrival of new flows and to inform the controller 6.3 of that arrival, including any relevant parameters such as packet header information at any level of encapsulation and link and virtual link identities. The controller 6.3 in turn updates the flow parameter store 6.4 with details of the newly arrived flow after checking for relevant policy information. Broadly speaking, the present embodiment operates by having the controller 6.3 send a packet deletion signal to the packet handler 6.2 on the buffer state moving to "delete". The packet handler 6.2 then begins to delete packets which belong to the flows whose characteristics are currently recorded within the flow parameter store 6.4. By arranging the flow parameter store to delete the vulnerable to discard status of the oldest flow in the store that is still vulnerable to discard on accepting the details of the newly arrived flow from the controller 6.3, the deletion operation of the packet handler is concentrated on newly arrived flows.

Figure 5:
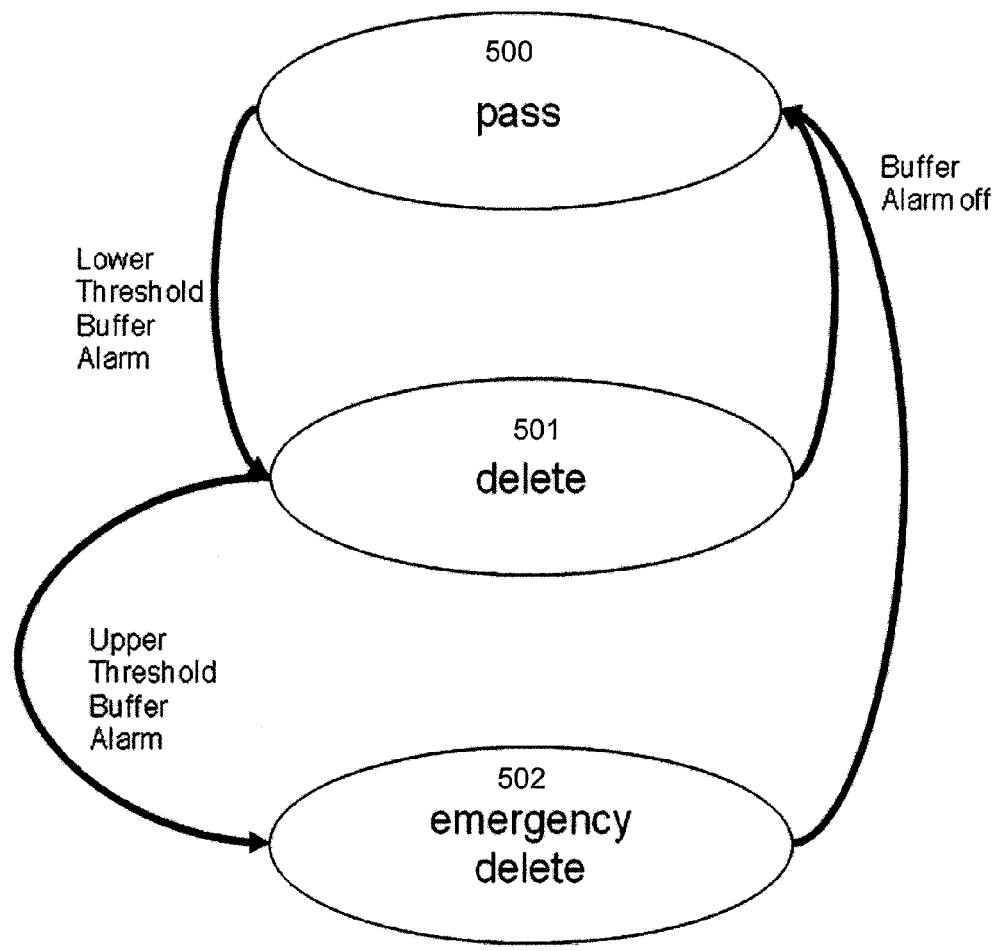
FIG. 5 illustrates buffer alarm indications within the flow-based QoS manager, according to one embodiment of the present invention.

FIG. 5 shows the three possible states of the buffer 6.1 as monitored by the controller 6.3. The buffer is initially in a state "pass" 500 which the controller 6.3 updates to state "delete" 501 on receiving a lower threshold buffer alarm from the buffer 6.1. If an upper threshold buffer alarm is received from the buffer 6.1 by the controller 6.3 when the buffer 6.1 is in the state "delete", then the buffer state is changed further to "emergency delete". If the buffer state is either "delete" or "emergency delete" 502 then the arrival of a buffer alarm off message from the buffer 6.1 causes the controller 6.3 to change the recorded buffer state to "pass".

Related to these buffer states, the controller signals to the packet handler 6.2 to behave as follow:
   If the state is "pass" then 6.3 indicates to 6.2 that no packet deletions should be performed
   If the state is "delete" then 6.3 indicates to 6.2 that it should perform deletion of any packet belonging to a particular group of flows whose status is "vulnerable to discard". The particular group which 6.3 points function 6.2 towards, is the group of flows that are all aggregated on the same output VLAN or virtual link. In a simplified embodiment, function 6 acts only as a shaper and flow-based QoS manager for flows whose input VLAN are all transferred to the same output VLAN and there is no switching. In this case, 6.3 needs only to indicate the appropriate input VLAN value.
   If the state is "emergency delete" then 6.3 instructs 6.2 to add one more flow id to the vulnerable to discard list, again where this is associated with a particular output group as in the bullet immediately above this. In that case 6.2 find the first arriving packet whose flow id is not already in the appropriate vulnerable to discard list and 62 then:
      Adds the status "vulnerable to discard" to that flow id and
      Deletes that packet and subsequent packets of the same flow id whilst 6.2 is still in the delete state as controlled by 6.3.

Figure 6:
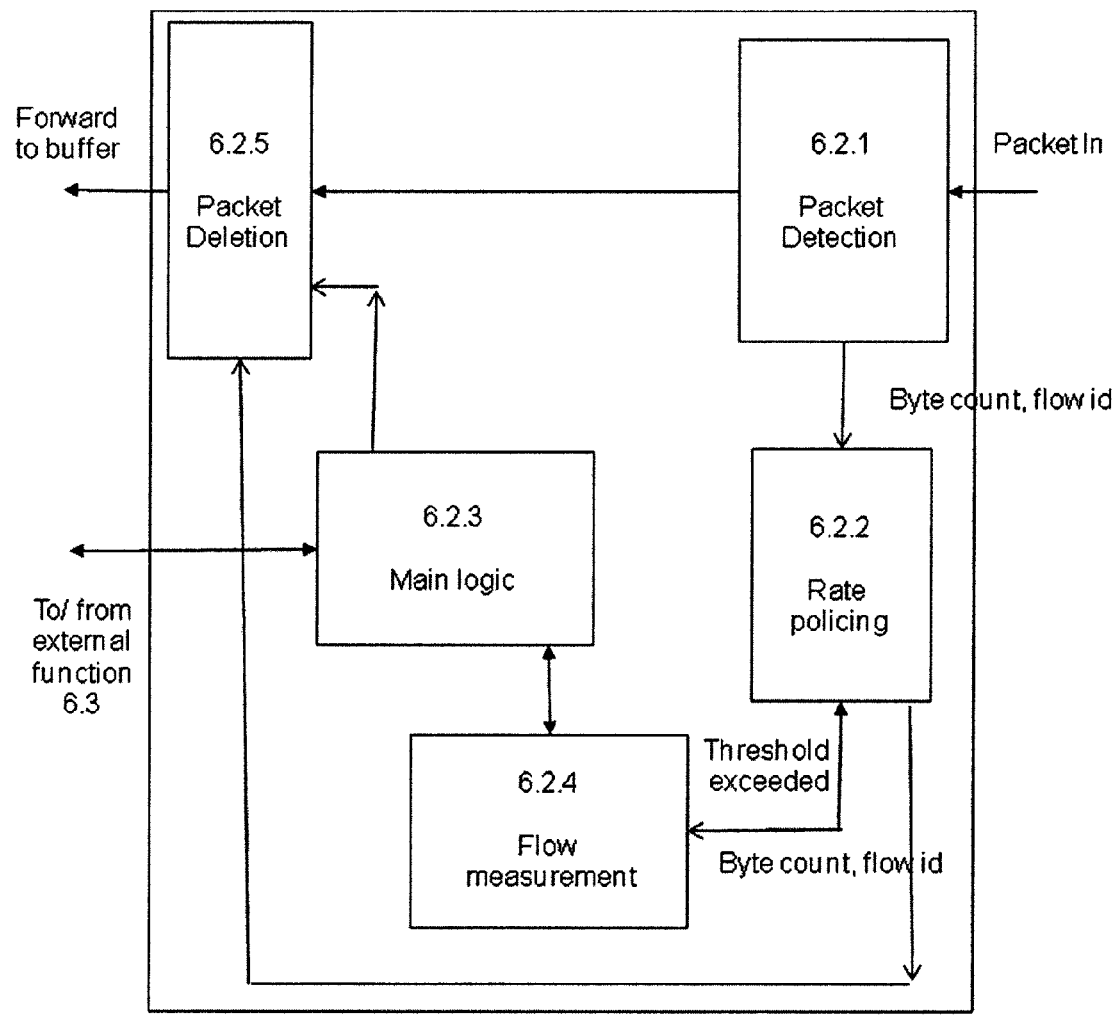
FIG. 6 illustrates an expansion of the functions of the packet handler 6.2, according to one embodiment of the present invention.

FIG. 6 is an expansion of function 6.2, showing the packet detection function 6.2.1, the rate policing function 6.2.2, and two other functions that are both under the control of the main logic function 6.2.3. This function, 6.2.3., interfaces with external function 6.3 and maintains state as instructed by 6.3. Furthermore, 6.2.3 controls both the flow measurement function 6.2.4 and the packet deletion function 6.2.5. This last function, 6.2.5., is instructed by 6.2.3 to discard packets from a vulnerable to discard list when the status of 6.2.3 is "delete". Also, the policing function 6.2.2 instructs packet deletion of a specific packet when sending rates are determined to be too high.

In some embodiments, the function 6.2.4 also performs the measurement actions required for policing, as shown in FIG. 6. I this case, the function 6.2.2 is responsive to "threshold exceeded" indications from 6.2.4 and then acts to delete the packet by informing 6.2.5.

Figure 7:
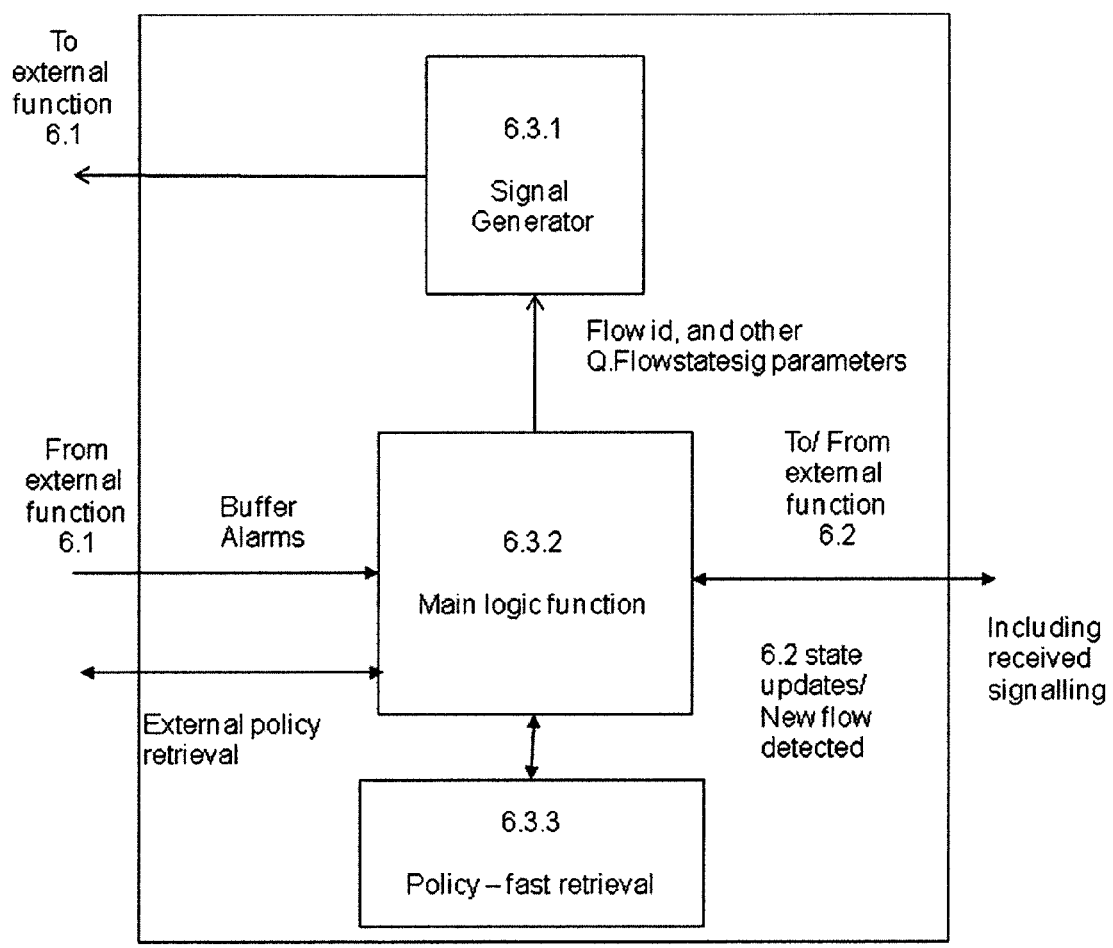
FIG. 7 illustrates an expansion of the functions of the controller 6.3, according to one embodiment of the present invention.

FIG. 7 is an expansion of function 6.3, showing its signal generation function 6.3.1, its main logic function 6.3.2., and a fast memory store for policy information. The function 6.3.2 is responsive to inputs from the buffer 6.1 and from the packet handler 6.2 and is responsible for maintaining the correct state of both of those two functions. Function 6.3.2 also initiates policy look-ups from 6.3.3 and determines an appropriate rate allocation for each flow. The function 6.3.3 contains both "default" policies" and "updated" policies. A default policy is typically an assigned medium preference priority and a small minimum guaranteed bandwidth, allowing a "top up" of capacity through the available rate pool. In many cases, it may be acceptable for a flow to start with a default policy whilst 6.3.2 retrieves from an external source a more appropriate policy and then downloads that into 6.3.3 for future reference. In this way, the policies of 6.3.3 are faster to retrieve and are adjusted (including the appropriate update to rate allocation and policing actions in 6.2) as soon as more information is available.

Function 6.2 detects that an arriving packet is a signalling packet, conforming with [24], and passes the flow id and signalling information to 6.3.2. These signals may be response signals from another flow-aware QoS manager function, if a tandem arrangement of such functions is deployed. It may also be from flow-aware source or destination end-systems.

Note that function 6.3.1 sends signals direct to an appropriate buffer 6.1, bypassing any packet deletion logic. The appropriate buffer, together with the relevant signalling parameters are passed from 6.3.2 to 6.3.1.

Function 6.3.2 also informs function 6.2.3 to commence a measurement for a flow in preparation for updating default rate parameters. The results of that measurement are sent back from 6.2.3 to 6.3.2 and then 6.3.2 updates 6.2.3 with changes to the policing (if any) for that flow.

Figure 8:
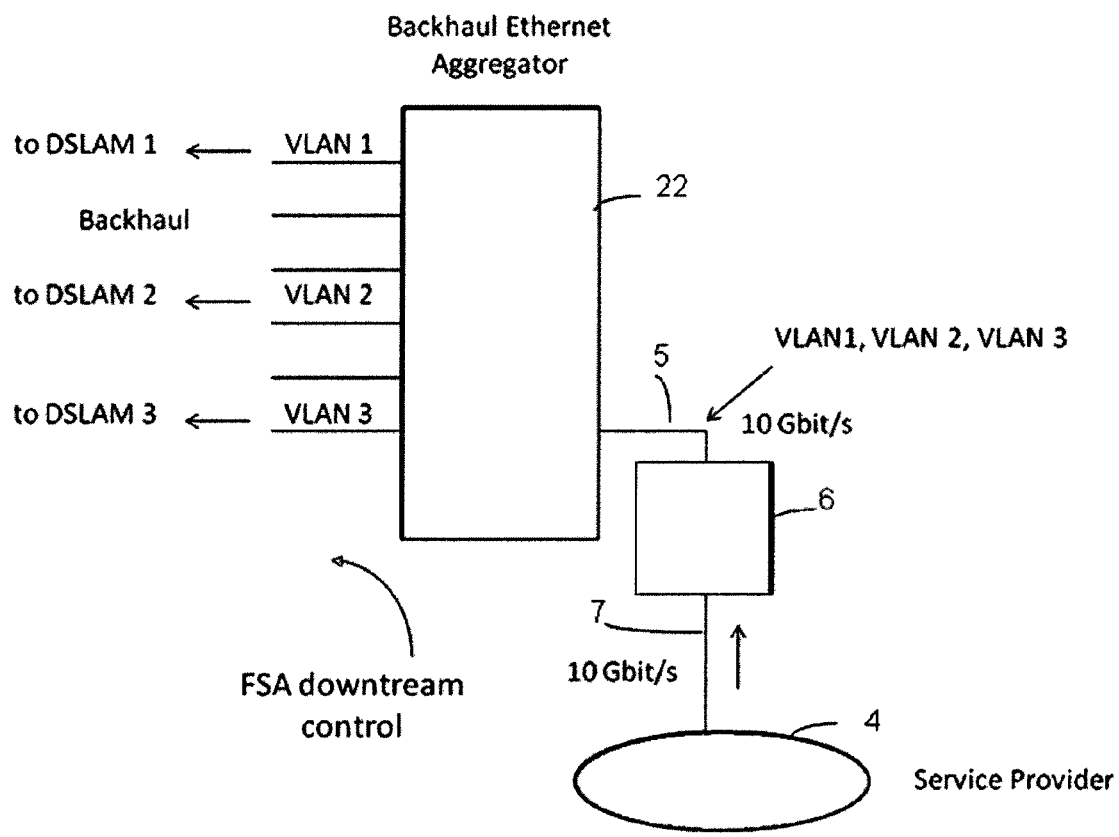
FIG. 8 illustrates an alternative network configuration involving a bit-stream connection product connecting content towards DSLAMS and beyond to the end users, where the connection product is managed by a flow-based QoS manager

FIG. 8 relates to the second preferred embodiment of the invention, where there are no switching functions to be performed. In this configuration, the flow-based QoS manager is an edge FSA shaper function managing an Ethernet VLAN-structured fibre bandwidth connection from the Network Provider, enabling the Service Provider 4 to maintain their own FSA QoS services and Intelligent Packet services towards or from a DSLAM (or base station) and, ultimately via copper (or wireless) to a number of end-users. Alternatively, in this configuration, the function 6 is a Network Provider function enabling QoS services and Intelligent Packet Services that can be offered to Service Providers.

The function 6 shapes the aggregate traffic of a specific VLAN according to the given maximum rate allowable, and given burst tolerance allowable. It also shapes the aggregate traffic towards each end user, again according to the maximum rate allowable and given burst tolerance allowable. In each case, it applies FSA QoS principles to incidents of congestion or incidents of excessive burstiness with respect to the individual flows that make up any particular aggregate traffic.

Figure 9:
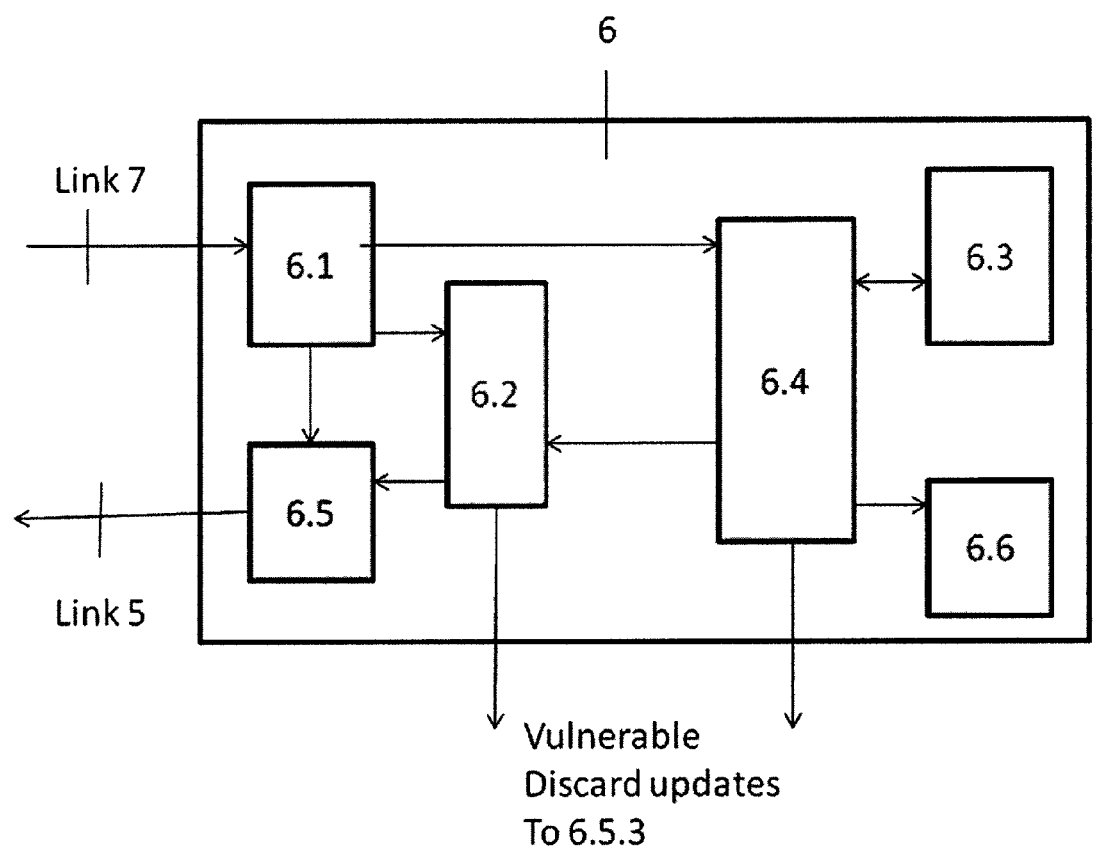
FIG. 9 is an expansion of function 6 for the second preferred embodiment.

FIG. 9 shows the combination of functions that are used to assign a FSA flow treatment to flows that have no associated FSA signalling.

Function 6.1 (Fast Packet Analyser)—identifies a packet arrival which has no corresponding flow state entry (i.e. no prior signalling packet detected).

Function 6.2 (Policy Cache) is used to determine what rate or preference may be an appropriate initial setting.

Function 6.3 (Measurements) initiates a byte-count measurement within a defined interval.

Function 6.4 (Deeper Packet Analyser and Policy look-up).

Function 6.5 (Shaper)

Function 6.6 (Network-generated FSA signalling)

For most flows, the initial assignment of flow state and flow treatment will be one that provides the greatest ability to "flex" as the actual packet load arrives and prior to the next measurement-based update. The principles of this are:

The initial assignment is a VR assignment with either a default minimum MR rate, or a minimum rate that the Policy Cache function 6.2 derives from the Fast Packet Analyser (function 6.1) inputs.

As with all VR flows, an available rate (AR) top-up is also added to the flow treatment, allowing the possibility of flexing beyond the minimum MR rate and prior to a measurement-based update.

Via a command from function 6.4, the first measurement interval commences in function 6.3 and, for a short period (typically a few hundred milliseconds), the actual arrival rate is observed in terms of bytes per time unit.

At the termination of the measurement interval in function 6.3, the function 6.4 is informed of the measured rate. Function 6.4 then performs further policy look-ups relating to this new information about the flow.

Whenever function 6.4 recovers additional data about a flow, either from measurements or from a deeper analysis of the packet, it initiates the following actions:

Updating or initialising flow state values (held within function 6.4) and policing/shaping parameters (within function 6.5).

If required, informing function 6.6 to send a FSA signal towards further downstream FSA functions, to update them about flow state and flow treatment.

Figure 10:
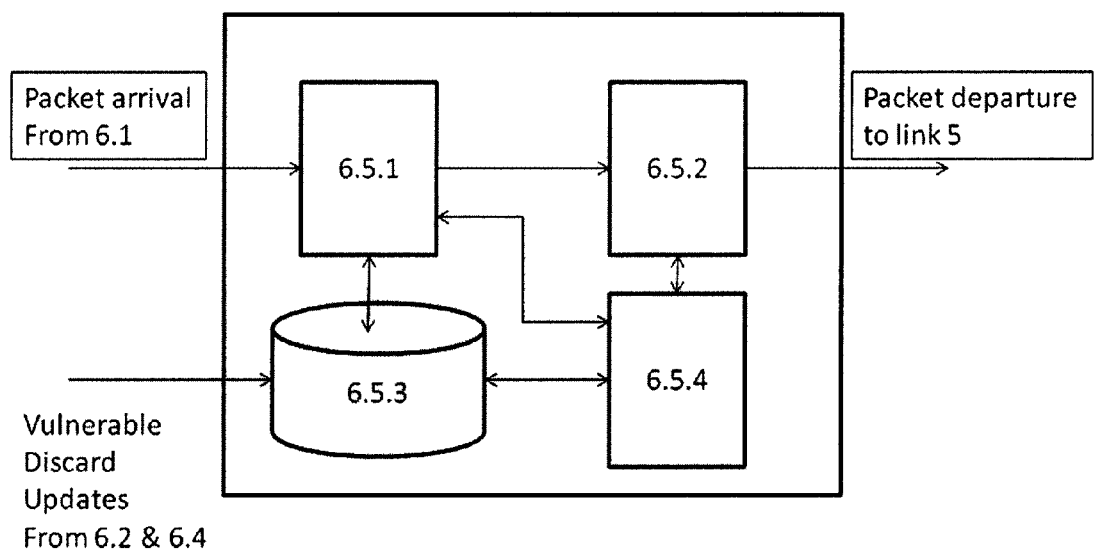
FIG. 10 is an expansion of the shaper function 6.5 for the second preferred embodiment.

FIG. 10 shows an expansion of the shaper function in this preferred embodiment. Function 6.5.1 performs several tasks:

It maintains a token bucket for each end-user aggregate, and a further one for the aggregate of all end user traffic on the link towards the DSMAM.

It maintains Virtual Queues. Each virtual queue monitors the packet arrival/departure process over a relatively long rolling interval, taking account of deletions triggered by "vulnerable discard" actions to build up a picture of whether packet arrivals are reaching a point of overload.

It performs packet deletion

For any packet of any preference priority, when the token bucket in 6.5.1 determines that immediate forwarding would exceed shaper limits, the packet is forwarded to the Delay/Deletion function 6.5.2, marked as "delay". A separate instruction is also sent to the control function 6.5.4, noting that the packet identity plus its aggregate identity (e.g. one of the packets for a given end-user), and its preference priority and (via function 6.5.3) the vulnerability to discard status of the associated flow state of that packet.

Packets marked as delayed within function 6.5.2 are delayed only for a short interval. In one embodiment, this interval may be determined to be the equivalent of the time interval of draining tokens such that:

The drain rate corresponds to a policed rate for that flow or flow aggregate (e.g. the policed rate for the all flows towards a given end-user)

The token count corresponds to a maximum sized packet.

In another embodiment, this delay interval may be a pre-determined fixed short interval. In a third embodiment, every packet is automatically delayed for a pre-determined fixed short interval, but function 6.5.4 is informed only of those that are to be examined for possible deletion as described next.

If the Control Function 6.5.4 detects there is already a delayed packet for the same aggregate identity (e.g. there is already a delayed packet waiting to go to the same given end-user), then function 6.5.4 proceeds as follows:

- If any delayed packet of this same aggregate identity belongs to a flow with flow status "vulnerable to discard", function 6.5.4 instructs function 6.5.2 to delete that packet
- If there are no such packets that can be deleted because of the "vulnerable to discard" status, the lowest preference priority packet is deleted from the Delay/ Deletion function 6.5.2
- The state of the flow id of this deleted packet is changed to "vulnerable to discard" and added to the list of such flows in 6.5.3.

Meanwhile, the virtual queue in 6.5.1 for that same aggregate contains trigger points that force discard of all further arriving packets towards 6.5.1 whenever any belong to a flow marked "vulnerable to discard". In 6.5.1, there is one virtual queue per end-user aggregate and one for the aggregate of all traffic towards the DSLAM (i.e. an identical set to the shaper token buckets).

A rolling virtual queue considers an arriving packet as the latest end-point of a pre-defined maximum interval, the oldest event of which (a previous packet arrival) rolls forward so as to keep the event interval always within this pre-defined maximum.

Within that interval the average load is calculated, taking account of all vulnerable discards. If the average load rises to a threshold level, then the "vulnerable discard alarm" is triggered in 6.5.1 and all subsequent packets that arrive will be deleted if they are associated with flows marked "vulnerable to discard". This action will continue until a lower threshold is reached in the virtual queue when the alarm is switched off.

Alarm threshold settings are set so as to minimise the further selection of an additional flow through actions of the Control Function 6.5.4 and Delay/Deletion Function 6.5.2 in response to "delay packet" decisions within 6.5.1. In other words, the thresholds are set below the maximum average rate that can be sustained towards an end-user (or towards the DSLAM). The margin may only be small and take account of the need to begin discard actions BEFORE leaving the only remaining choice being those packets marked for possible deletion by 6.5.1 through notification to 6.5.4 when a burstiness or jitter threshold is reached or exceeded. So load reduction should already be happening via discard of vulnerable flows, making the likelihood far more rare that there will be a random further selection of another flow id for discard. Short-term variations of load within the virtual queue measurement interval, where such variations imply short overload events that are undetected by the virtual queue mechanism also need to be taken into account.

Note that if the virtual queue measurement interval is very short then it could trigger alarms frequently whenever there is some degree of packet clustering. Furthermore, if the virtual queue length is too long, there may be undetected intervals of packet overload within that time period. This effect can be compensated by setting the threshold (to begin deletion of packets associated with vulnerable to discard flows) below the absolute maximum allowed rate for that flow aggregate.

Function 6.5.3 is updates on its list of flows vulnerable to discard from functions 6.2 and 6.4. This occurs, as necessary, with each new packet arrival.

Exemplary Computer Platform

Figure 11:
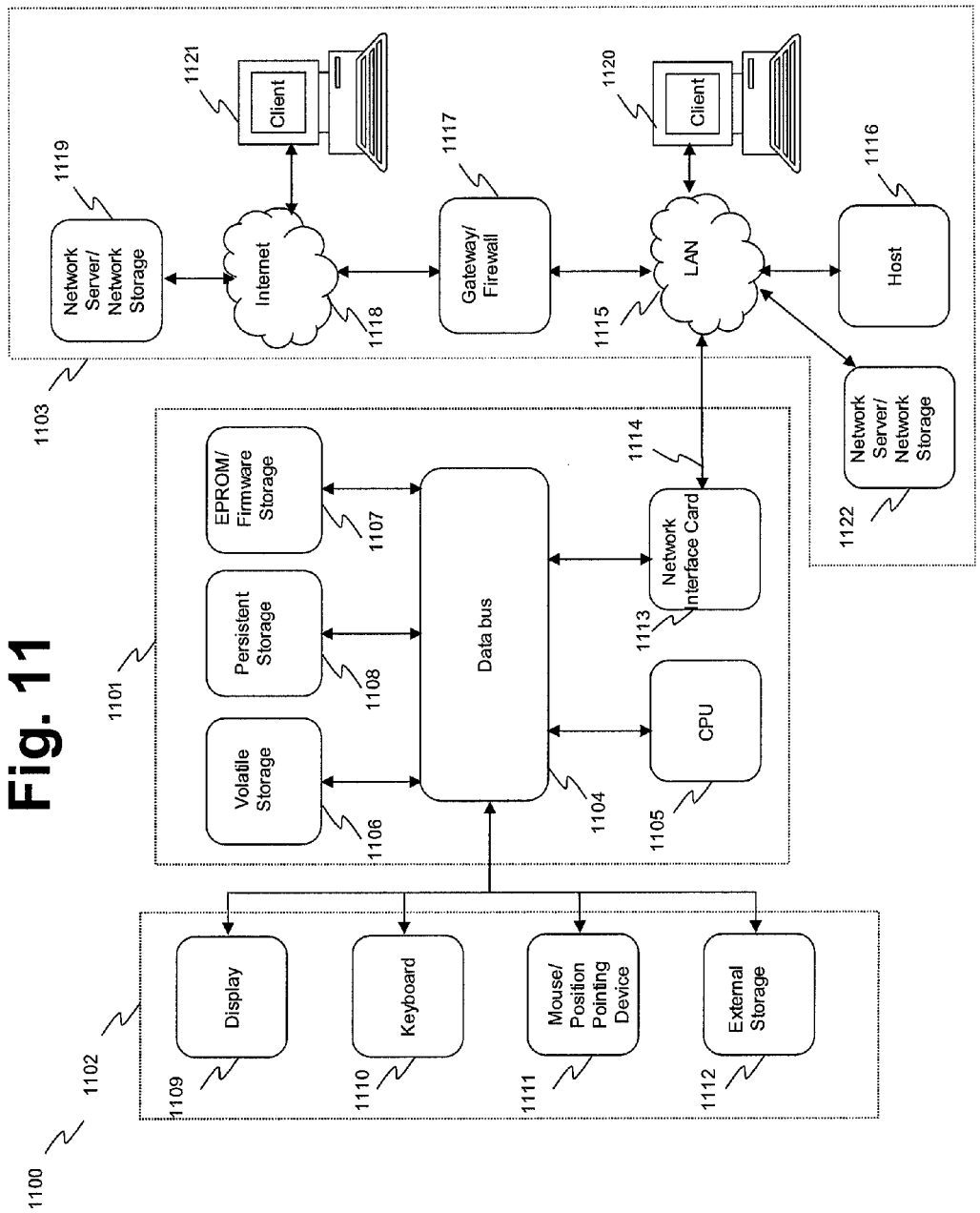
FIG. 11 is an illustration of an embodiment of a computer platform upon which an embodiment of the invention may be deployed.

FIG. 11: illustrates an exemplary embodiment of a computer platform upon which the inventive system may be implemented.

FIG. 11 is a block diagram that illustrates an embodiment of a computer/server system 1100 upon which an embodiment of the inventive methodology may be implemented. The system 1100 includes a computer/server platform 1101, peripheral devices 1102 and network resources 1103.

The computer platform 1101 may include a data bus 1105 or other communication mechanism for communicating information across and among various parts of the computer platform 1101, and a processor 1105 coupled with bus 1101 for processing information and performing other computational and control tasks. Computer platform 1101 also includes a volatile storage 1106, such as a random access memory (RAM) or other dynamic storage device, coupled to bus 1105 for storing various information as well as instructions to be executed by processor 1105. The volatile storage 1106 also may be used for storing temporary variables or other intermediate information during execution of instructions by processor 1105. Computer platform 1101 may further include a read only memory (ROM or EPROM) 1107 or other static storage device coupled to bus 1105 for storing static information and instructions for processor 1105, such as basic input-output system (BIOS), as well as various system configuration parameters. A persistent storage device 1108, such as a magnetic disk, optical disk, or solid-state flash memory device is provided and coupled to bus 1101 for storing information and instructions.

Computer platform 1101 may be coupled via bus 1105 to a display 1109, such as a cathode ray tube (CRT), plasma display, or a liquid crystal display (LCD), for displaying information to a system administrator or user of the computer platform 1101. An input device 1110, including alphanumeric and other keys, is coupled to bus 1101 for communicating information and command selections to processor 1105. Another type of user input device is cursor control device 1111, such as a mouse, a trackball, or cursor direction keys for communicating direction information and command selections to processor 1105 and for controlling cursor movement on display 1109. This input device typically has two degrees of freedom in two axes, a first axis (e.g., x) and a second axis (e.g., y), that allows the device to specify positions in a plane.

An external storage device 1112 may be coupled to the computer platform 1101 via bus 1105 to provide an extra or removable storage capacity for the computer platform 1101. In an embodiment of the computer system 1100, the external removable storage device 1112 may be used to facilitate exchange of data with other computer systems.

The invention is related to the use of computer system 1100 for implementing the techniques described herein. In an embodiment, the inventive system may reside on a machine such as computer platform 1101. According to one embodiment of the invention, the techniques described herein are performed by computer system 1100 in response to processor 1105 executing one or more sequences of one or more instructions contained in the volatile memory 1106. Such instructions may be read into volatile memory 1106 from another computer-readable medium, such as persistent storage device 1108. Execution of the sequences of instructions contained in the volatile memory 1106 causes processor 1105 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1105 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 1108. Volatile media includes dynamic memory, such as volatile storage 1106.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 1105 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on the data bus 1105. The bus 1105 carries the data to the volatile storage 1106, from which processor 1105 retrieves and executes the instructions. The instructions received by the volatile memory 1106 may optionally be stored on persistent storage device 1108 either before or after execution by processor 1105. The instructions may also be downloaded into the computer platform 1101 via Internet using a variety of network data communication protocols well known in the art.

The computer platform 1101 also includes a communication interface, such as network interface card 1113 coupled to the data bus 1105. Communication interface 1113 provides a two-way data communication coupling to a network link 1115 that is coupled to a local network 1115. For example, communication interface 1113 may be an integrated services digital network (ISDN) card or a modem to provide a data communication connection to a corresponding type of telephone line. As another example, communication interface 1113 may be a local area network interface card (LAN NIC) to provide a data communication connection to a compatible LAN. Wireless links, such as well-known 802.11a, 802.11b, 802.11g and Bluetooth may also used for network implementation. In any such implementation, communication interface 1113 sends and receives electrical, electromagnetic or optical signals that carry digital data streams representing various types of information.

Network link 1113 typically provides data communication through one or more networks to other network resources. For example, network link 1115 may provide a connection through local network 1115 to a host computer 1116, or a network storage/server 1117. Additionally or alternatively, the network link 1113 may connect through gateway/firewall 1117 to the wide-area or global network 1118, such as an Internet. Thus, the computer platform 1101 can access network resources located anywhere on the Internet 1118, such as a remote network storage/server 1119. On the other hand, the computer platform 1101 may also be accessed by clients located anywhere on the local area network 1115 and/or the Internet 1118. The network clients 1120 and 1121 may themselves be implemented based on the computer platform similar to the platform 1101.

Local network 1115 and the Internet 1118 both use electrical, electromagnetic or optical signals that carry digital data streams. The signals through the various networks and the signals on network link 1115 and through communication interface 1113, which carry the digital data to and from computer platform 1101, are exemplary forms of carrier waves transporting the information.

Computer platform 1101 can send messages and receive data, including program code, through the variety of network (s) including Internet 1118 and LAN 1115, network link 1115 and communication interface 1113. In the Internet example, when the system 1101 acts as a network server, it might transmit a requested code or data for an application program running on client(s) 1120 and/or 1121 through Internet 1118, gateway/firewall 1117, local area network 1115 and communication interface 1113. Similarly, it may receive code from other network resources.

The received code may be executed by processor 1105 as it is received, and/or stored in persistent or volatile storage devices 1108 and 1106, respectively, or other non-volatile storage for later execution.

It should be noted that the present invention is not limited to any specific firewall system. The inventive policy-based content processing system may be used in any of the three firewall operating modes and specifically NAT, routed and transparent.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination a communications network and a method of operating a communications network. It is intended that the specification and examples be considered as exemplary only, with a true scope and spirit of the invention being indicated by the following claims.

What is claimed is:

1. A method of operating a packet subnetwork within a network system, comprising: receiving one or more communication packets indicative of a commencement of a packet flow through said subnetwork, said commenced packet flow comprising a plurality of packets; upon receipt of said one or more communication packets, retrieving policy information relating to an initial or sustained QoS treatment of the commenced packet flow, wherein said policy information is either derived from packet header information at any level of encapsulation or is derived from policy attributes associated with a physical link on which a packet of the commenced packet flow arrived or will depart, or is associated with flow aggregates, which encompass the commenced packet flow; wherein the method further comprises, in response to receipt of said one or more communication packets, and based on the retrieved policy information, permitting transfer of the commenced packet flow subject to per-flow rate and burst limits and per-aggregate flow rate and burst limits of the flow aggregates, which encompass the commenced packet flow, wherein the method further comprises, in response to receipt of said one or more communication packets, causing each said packet to be delayed prior to transmission towards its destination; and, in response to a receipt of a new communication packet that causes a threshold of burst tolerance or packet jitter to be reached or exceeded on a flow or group of flows, identifying among the said delayed packets belonging to the flow or group of flows and the new packet, which, if any of the packets, has an associated vulnerable to discard state or has the lowest preference priority compared to the others; selecting a single packet randomly chosen among any that are vulnerable to discard or, if none, randomly among any that have a common lowest preference priority; wherein in response to the said packet selection changing the flow state of the corresponding flow such that the flow is vulnerable to discard.

2. The method of claim 1, wherein upon receipt of said one or more communication commencement packets, storing a set of communication identifiers, wherein each communication identifier enables identification of packets belonging to one of said commenced packet communications.

3. The method of claim 2 wherein, if the retrieved policy information indicates guaranteed bandwidth management should be applied to the said flow and where the retrieved policy information also indicates the said flow has an unknown flow rate, then assigning to the flow an initial minimum guaranteed rate the initial additional rate assigned from a pool of capacity divided among flows which have this QoS policy; allowing immediate transfer of the flow at a rate equal to or less than the minimum plus additional rate allowance; assigning a preference priority, or protected communication indication, based on the retrieved policy information; and assigning an initial discard probability to the flow that will determine if it is included in the list of flows that are treated as vulnerable to discard in the event of congestion.

4. The method of claim 1 or claim 2, wherein, if the retrieved policy information indicates that Best Effort management should be applied to the flow, then assigning each packet of the flow: to a Best Effort aggregate and allowing transfer of all such packets assigned to this said Best Effort aggregate, subject to aggregate rate and burst limits assigned to this said Best Effort aggregate; a preference priority that is assigned to all such packets that are assigned to this said Best Effort aggregate; a discard probability that is assigned to all such flows that are assigned to this said Best Effort aggregate.

5. The method of claim 2, wherein in response to receipt of said one or more communication commencement packets, and to retrieved policy information, and where the retrieved policy information indicates guaranteed bandwidth management should be applied to the flow and where the retrieved policy information also indicates that the said flow has a known flow rate, then assigning to the flow a preference priority, or protected communication indication, based on the retrieved policy information; assigning an initial discard probability to the flow that determines if said flow is included in the list of flows that are treated as vulnerable to discard in the event of congestion; assigning a pre-determined guaranteed rate; and allowing immediate transfer of the flow at a rate equal to or less than the pre-determined rate.

6. The method of claim 1 or claim 2, wherein in response to receipt of said one or more communication commencement packets, initiating an initial measurement period, during which actual sending rate of the flow is measured.

7. The method of claim 6, wherein in response to a termination of the measurement period, retrieving any changes of policy that derive from the measured rate.

8. The method of claim 7, wherein in response to any changes of policy based upon measured rate, updating a flow state and policer/shaper parameters according to the said changes in policy.

9. The method of claim 1, wherein in response to a predetermined condition being met, removing an identifier from said set of stored communication identifiers associated with flows vulnerable to discard prior to a cessation of an associated communication.

10. The method of claim 1, wherein on a threshold level of congestion being reached in a packet subnet, identifying packets belonging to a communication associated with one of said set of stored communication identifiers corresponding to one of the said flows vulnerable to discard; and degrading a forwarding of packets so identified, relative to packets belonging to other communications.

11. The method of claim 1, where a number of flows included in the flows vulnerable to discard list will be divided into groups that are each associated with a specific output link, and a new flow is added to one such group if the current aggregate rate of that group is less than a pre-determined threshold.

12. The method according to claim 9 where a flow identifier is not removed from the list of flows vulnerable to discard if doing so would cause a group of common flows of which the commenced packet flow is a member of that are output on an output link to have an aggregate rate that is less than a pre-determined threshold.

13. The method according to claim 11 where said set of communication identifiers comprises a plurality of subsets of communication identifiers, all associated with a same output link on which packets associated with such identifiers will be forwarded, a communication identifier first being placed in a first subset that is vulnerable to discard and moving to a second subset that is less vulnerable to discard on occurrence of a subset removal condition being met, wherein, on onset of congestion, packets in said second subset are forwarded in preference to packets in said first subset.

14. The method according to claim 7 where an increase in minimum rate after measurement is subject to a sum of related minimum rates being less than some threshold value.

15. The method according to claim 2 wherein, upon new flow arrivals when congestion have started or wherein traffic levels are close to some threshold indicative of an onset of congestion, placing said flows in a vulnerable to discard list.

* * * * *